(12) United States Patent
Chapin et al.

(10) Patent No.: US 9,021,084 B2
(45) Date of Patent: Apr. 28, 2015

(54) NETWORK DEVICE DISCOVERY

(75) Inventors: David M. Chapin, Gresham, OR (US); Jonathan Allen Edmonds, Silverton, OR (US); Andrew T. Stutzman, Silverton, OR (US); Brian Robert Glass, Wilsonville, OR (US)

(73) Assignee: Xerox Corporation, Norwalk, CT (US)

(*) Notice: Subject to any disclaimer, the term of this patent is extended or adjusted under 35 U.S.C. 154(b) by 830 days.

(21) Appl. No.: 12/603,805

(22) Filed: Oct. 22, 2009

(65) Prior Publication Data

US 2011/0099264 A1    Apr. 28, 2011

(51) Int. Cl.
*G06F 15/177* (2006.01)
*G06F 15/173* (2006.01)
*H04L 12/24* (2006.01)

(52) U.S. Cl.
CPC ..................................... *H04L 41/12* (2013.01)

(58) Field of Classification Search
CPC ....... G06F 3/12; G06F 3/1232; G06F 3/1293; H04W 8/005
See application file for complete search history.

(56) References Cited

U.S. PATENT DOCUMENTS

| | | | |
|---|---|---|---|
| 6,920,506 B2* | 7/2005 | Barnard et al. | 709/245 |
| 7,324,462 B1* | 1/2008 | Page et al. | 370/255 |
| 7,379,200 B2* | 5/2008 | Mori | 358/1.15 |
| 7,463,378 B2* | 12/2008 | Williams et al. | 358/1.15 |
| 7,526,482 B2 | 4/2009 | Edwards et al. | |
| 7,783,803 B2* | 8/2010 | Roth et al. | 710/106 |
| 8,064,081 B2* | 11/2011 | Sumita et al. | 358/1.15 |
| 8,064,366 B2* | 11/2011 | Page et al. | 370/255 |
| 8,670,350 B2* | 3/2014 | Page et al. | 370/255 |
| 2001/0006551 A1* | 7/2001 | Masaki | 380/51 |
| 2004/0057448 A1* | 3/2004 | Nakamura | 370/428 |
| 2005/0044479 A1* | 2/2005 | Willams et al. | 715/500.1 |
| 2006/0012828 A1* | 1/2006 | Ohta | 358/1.18 |
| 2006/0017958 A1* | 1/2006 | Jackson et al. | 358/1.14 |
| 2006/0017963 A1* | 1/2006 | Sakuda et al. | 358/1.15 |
| 2007/0030516 A1* | 2/2007 | Tsuji et al. | 358/1.15 |
| 2008/0207129 A1* | 8/2008 | Page et al. | 455/41.3 |
| 2010/0115146 A1* | 5/2010 | Roth et al. | 710/11 |

* cited by examiner

*Primary Examiner* — Ranodhi Serrao
*Assistant Examiner* — Thomas Richardson
(74) *Attorney, Agent, or Firm* — Michael J. Nickerson; Basch & Nickerson LLP

(57) ABSTRACT

A system and method enable a local area network connected mobile device to discover, via an ancillary wireless communication channel, a local area network connected device and install the appropriate driver and network configuration information when the mobile device and network connected device are brought into physical close proximity with each other.

16 Claims, 3 Drawing Sheets

NETWORK DEVICE DISCOVERY

BACKGROUND

Printers/multifunction-devices designed for use in a network environment routinely offer greater functionality than a simple desktop printer. In addition to offering more printing and post-print options (collation, binding, etc.), network printers frequently come with built-in processors, hard drives for data storage, a web server for communicating on a network, and sophisticated management software.

Once a printer is physically connected to a network, such as an intranet, the printer can be managed directly from a standard web browser or any web-enabled application. The management software enables administrators to monitor, configure, and troubleshoot network printers from a web browser or a web enabled application. In addition, the management software provides hotlinks to product information, software drivers, help-desk, and customer support.

The same scenario may apply to other network connected devices. Examples of network connected devices may include scanners, readers, fax machines, label makers, hard drives, or servers.

Once a printer/scanner/fax or multifunction device is physically connected to a network, a user on the network can install a device driver upon any given mobile device if the user wishes to send print jobs to print or get scans from a scanner, etc. In a networked print environment, installing a printer can be a troublesome task. Many installation programs search the network for all printers that match the one the user is trying to install.

Printers with embedded web servers and hard disks can provide access to the printer driver installer through the printer's embedded web server. However, when the installer program is run from the printer, the installer program may still search for all printers of the selected type, since the installer program does not know from which printer the installer program was run.

The installation program presents the user with a list of all printers of the particular type. The user can pick out which printer the user wants to install. This may prove tedious for the user, since the presented list may contain information not easily understood by the user, such as internet protocol addresses or technical nomenclature established by the network administrator.

The above problems are encountered by mobile user who may be only randomly on site, and even then, only transiently. Mobile users typically want to quickly find a printing and/or scanning device on the network and configure a driver(s) for that device.

Moreover, users often have difficulty finding devices on the networks that span multiple subnets because of technical limitations of network topologies and/or security mechanisms. In the past, users required technical savvy to determine a device's internet protocol address and use that to configure a driver on a personal computer or required outside support to configure a driver on the user's personal computer for the specific printing device.

Technical issues, with regards to network topology and network security mechanisms, have hindered users from easily locating the network connected devices. For example, often times the user's personal computer or laptop resides on a different network than the printing device. This can be quite frustrating when the user is standing next to a printing device and is not able to connect to the printing device because, for example, the wireless network, to which the user's laptop is connected, is on a separate subnet, a subnet that is different than the one that the printing device is on.

Secondly, security mechanisms often results in network restrictions that hinder the use of standard network discovery mechanisms across subnets. Even when a network solution exists that will work across subnets, the network solution usually requires pre-configuration by a technically knowledgeable person with an awareness of the local network configuration.

Referring to FIG. 1, a conventional system enables the installing of a networked printer by allowing a user to browse to a printer's embedded web server and automatically install the correct printer driver for that printer on to the user's computer. If a user at host device 10 (which may be a personal computer), which is connected to network 100 (which may be an intranet, a local area network, a wide area network, and/or the Internet), wishes to enable or establish a printer 20 (which is already on, connected to, the network 100); for example, to enable or establish a printer in this context indicates that the user desire to have the functionality or capability to send print jobs to printer 20 from the user's host device 10; the user needs carry out the appropriate routines; e.g., invoke a printer add wizard; to enable or establish the printer on host device 10.

Printer 20 may be of the type which contains a built-in web server, such as for example, the Xerox CentreWare™ Internet Services. However, any other built-in web server which enables the printer to be managed from a standard web browser or any web-enabled management application may be used. Web servers may be embedded in the printer's firmware, or if the printer has a hard disk, stored on the hard disk.

The user opens any standard Internet browser, such as Internet Explorer™ or Netscape™, on host device 10. The user browses to the printer's web page, using the user's personal computer or work station display 11; i.e., the user's browser locates the desired printer on the network. This is accomplished using any standard network protocol such as a TCP/IP connection. The TCP/IP connection may pass through a network router from the user's host device 10 to the printer 20.

The printer's web page 12 is displayed in the user's browser. From a web page, the user may select a link <Install Printer>. Selection is made by clicking on the hypertext link to install a printer (enable or establish the printer on the host device 10.

If the printing system is set up so that the printer drivers are hosted on the local host device, a web page or window may appear after the user clicks on the link. This web page or window prompts the user to select the particular printer driver to be installed: a <Windows™ Printer Driver Installer> link or a <MacIntosh™ Printer Driver Installer> link.

When the user clicks on the <Windows™ Printer Driver Installer> link, the printer 20 causes the internet protocol address of the printer to be stored on the user's computer. This may be accomplished by firmware in the printer 20 which, in response to activation of the <Install Printer Drivers> link, transmits a cookie to the user's host device 10. The cookie contains the internet protocol address of the printer 20 and may also contain other information. For example, if the printer 20 does not contain its printer driver, the user will need to obtain the printer driver (or other installation files) from a different location if the printing system is set up so that the printer drivers are hosted on the local host device.

On the other hand, if the printing system is set up so that the printer drivers are hosted on a print server or other network connected device or server, the cookie may contain the location of the print server with the appropriate print driver such that when the host device invokes a print job, the print server processes the job, using the print driver, for the printer 20.

Printer 20 may not have sufficient memory to store a printer driver (if it does not have a hard disk, for example), or a more recent, updated version of the printer driver may be released, but not stored on printer 20. In this case, the cookie may contain the address of the data source for the printer driver or other required installation files. The printer driver and other installation information may be located at another printer, such as printer 30, or another web site on the network 100 (or on another network, such as the Internet). When the cookie is received, this information will also be stored on the user's host device 10.

After the internet protocol of the printer 20 is stored at the user host device 10, the printer's web server runs the installation program on the host device. The installation program screen is the first screen the installation program presents. This screen displays the printer 20's IP address and asks the user to confirm installation of the printer driver. If the user confirms by clicking on install link, the installer files are downloaded from either printer 20 (if the installer files are located there) or the other location of the printer driver files. The installer uses the driver data source address to automatically download the correct driver files from the data source and the printer's address to install the printer on the user's host device 10. When a correctly configured printer driver is installed on the user's host device, a final web page is displayed. This system simplifies installation and/or selection of a printer in a multiple printer-networked environment.

However, in many instances an end user, particularly a transient user with a mobile device, may not be sure if the web page displayed in the user's browser is really the web page of the printer the user wishes to install. Indeed, a given mobile device may not have a web interface, yet the user may, for example, still wish to print via the network.

Alternatively, a system for installing a printer driver for a printer connected on a network may provide a link between the seemingly ambiguous networked printer world and a physical connection to which users are accustomed; for example, a user is accustomed to connecting a desktop printer directly to a personal computer via a USB or parallel port.).

Thus, it would be desirable if a user with an intranet connected mobile device or a device with direct device to device wireless communication functionality, having physically located a printer or other network connected device and in close proximity with same, could install the driver for the printer or other network connected device on the mobile device.

Furthermore, it would be desirable if an end user with a mobile device, being physically located in proximity with a printer or other network connected device, could properly configure the mobile device for utilization of the printer or other network connected device. Such a system for installing a network connected device upon an end user mobile device may include a network connected device enabled with ancillary wireless communication as well as a device driver. The end user mobile device is also ancillary wireless communication enabled matching the network connected device's enabled ancillary wireless communication. A device that is ancillary wireless communication enabled allows the device to communicate directly with another device in a wireless environment, such as a radio frequency based communication or a direct optical communication (infrared communication), and also allows the device to be discoverable by another ancillary wireless communication enabled device.

Further, a discovery and installer application may be located on the end user mobile device or may be installed on the network connected device. All this is arranged so that when the end user device is brought within nearby proximity of the network connected device, a discovery connection is invoked and the end user mobile device is rendered responsive to receipt of the network connected device identification and installs the network connected device driver.

In addition, it would be desirable to enable an end user mobile device connection to a network connected device by activating a device discovery software application on an end user mobile device or a network connected device, which may be followed by placing that end user mobile device in close proximity to a network connected device.

At some point, the end user mobile device or network connected device is activated into a discovery mode that causes the end user mobile device or network connected device to be discoverable via an ancillary wireless communication channel which allows the other device to detect it. Upon establishing an ancillary wireless communication connection, the end user mobile device receives, from the network connected device, network identification information and the network configuration information from the network connected device via the ancillary wireless communication channel or connection. This allows configuration of the end user mobile device with the correct network connected device driver information.

Moreover, it would be desirable to enable end user mobile device connection to a network connected device by activating a device discovery software application on an end user mobile device or a network connected device and placing the end user mobile device in close proximity to the network connected device. At some point, thereafter the end user mobile device or network connected device is activated into a discovery mode that causes the end user mobile device or network connected device to be discoverable via an ancillary wireless communication channel; e.g., a low-power radio communication specification, such as Bluetooth™, and detectable by the end user mobile device or network connected device. This allows for sending the network connected device network identification information over the ancillary wireless communication channel to the end user mobile device as well as obtaining network configuration information from the network connected device via the ancillary wireless communication channel so that the end user mobile device may be configured with the correct network connected device driver information.

BRIEF DESCRIPTION OF THE DRAWINGS

The drawings are only for purposes of illustrating various embodiments and are not to be construed as limiting, wherein.

DETAILED DESCRIPTION

Figure 1:
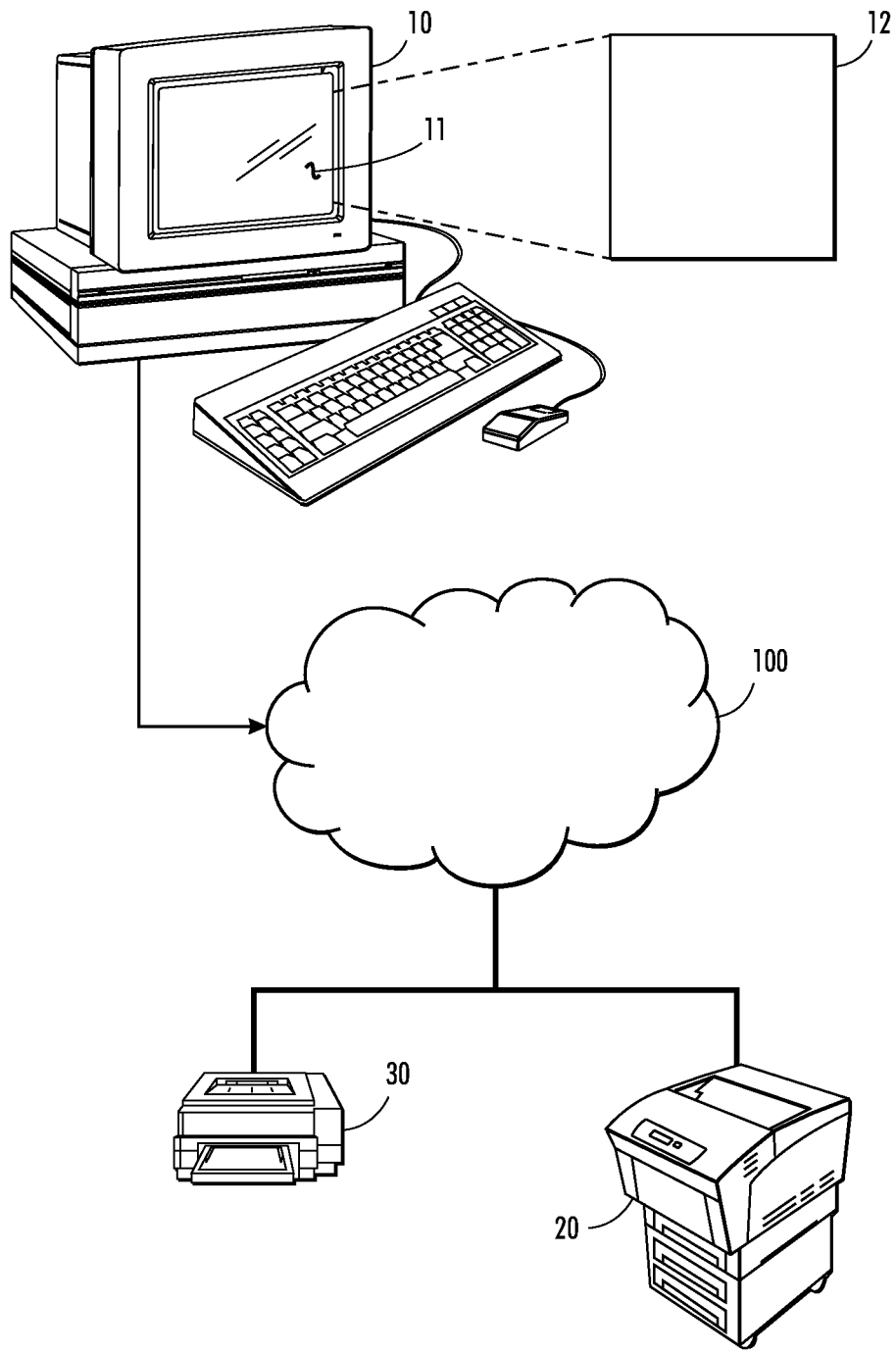
FIG. 1 illustrates a schematic of a system having an installed networked printer.

For a general understanding, reference is made to the drawings. In the drawings, like references have been used throughout to designate identical or equivalent elements. It is also noted that the drawings may not have been drawn to scale and that certain regions may have been purposely drawn disproportionately so that the features and concepts could be properly illustrated.

As mentioned above, an end user may bring a laptop or other mobile device within a short physical distance of a network connected device, having an ancillary wireless communication capability, that the end user wishes to invoke discovery, the ancillary wireless communication being a low-power radio communication, such as a Bluetooth™ communication or infrared communication, to enable a direct device to device wireless communication. Being in close proximity (in range of the low-power radio communication or infrared communication), the end user's mobile device may detect the ancillary wireless communication enabled network connected scanning and/or printing device.

The end user mobile device can communicate with the network connected device, via the ancillary wireless communication channel, to obtain network configuration information pertaining to the network connected device. Using the obtained network configuration information pertaining to the network connected device, the end user mobile device can establish a network connection with the network connected device. Upon establishing the network connection with the network connected device, the end user mobile device can send data to the network connected device for appropriate processing.

For example, if the network connected device is a printer, the end user mobile device can send a print job to the network connected printer, via the network connection.

As previously noted, the discovery of devices and services within a network is a problem that many have tried to solve. Technical limitations in the network infrastructure and security measures often prevent many solutions from working. The following comprise a list of some known network discovery solutions:

1) Multicast DNS/DNS-SD (DNS-Service Discovery) (RFC 2782)
2) Link-Local Multicast Name Resolution (LLMNR-RFC 4795)
3) Address auto-configuration (RFC 3927)
4) Service Location Protocol (SLP-RFC 2608 and RFC 3224)
5) UPnP-SSDP (Universal Plug-n-Play-Simple Service Discovery Protocol)

Each printer in the network includes a Bluetooth™ or other ancillary wireless communication ability, which identifies the printer the user wants to install when the discovery mode is activated. Ancillary wireless communication ability is herein defined as communication ability provided to a device in addition to, beyond and different from, any network connection communication ability that device may have, which enables a device to communicate directly with another device in a wireless manner over a very short distance.

When the end user host device "discovers" the Bluetooth™ or ancillary wireless communication broadcast, the installer application resident therein installs the correct printer driver on the user's personal computer. The Bluetooth™ communication or ancillary wireless communication may be activated at the printer by accessing a special menu on the printer's display panel. Once the Bluetooth™ or ancillary wireless communication is activated, the printer broadcasts a data packet on the network. This packet contains enough distinguishing configuration and device driver information such that the end user device knows the printer address that sent it and can proceed with the installation of that network connected printer.

Figure 2:
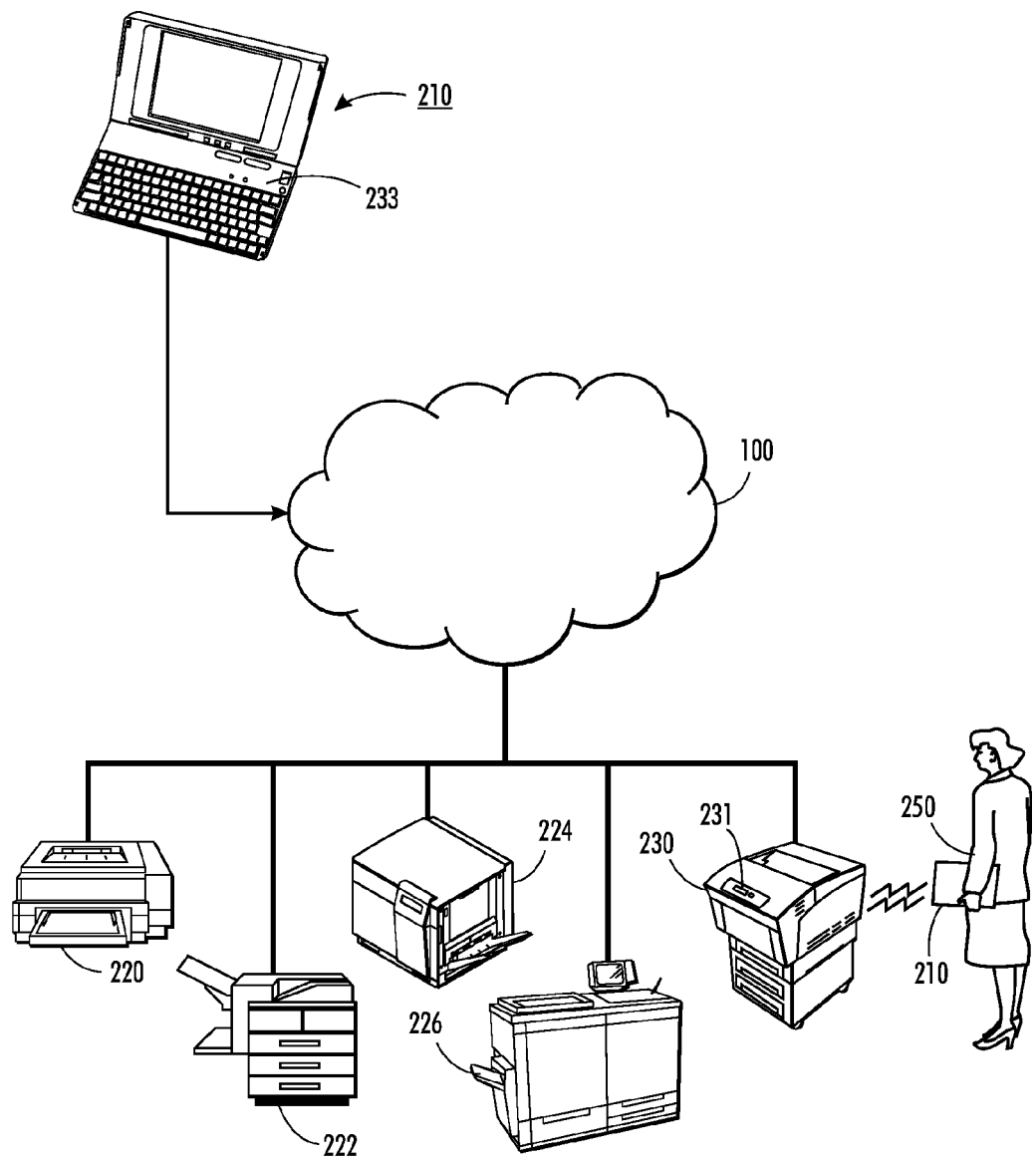
FIG. 2 illustrates in schematic of a system having an installed discoverable networked printer.

FIG. 2 shows, in schematic form, an example of one alternative embodiment according to the teachings provided herein. In this instantiation notebook 210 is the end user mobile device connected to network 100. Notebook 210 is provided with Bluetooth™ or ancillary wireless communication capabilities 233 and software applications as described below. As those skilled in the art will recognize other examples of mobile devices may include a personal digital assistant (PDA), cell phone, camera, test equipment, a handheld global positioning system (GPS) device, or some hybrid composite of the foregoing.

In FIG. 2, network 100 is provided with a number of network connected devices including fax 220, multifunction device 222, scanner 224, production printer 226, as well as printer 230. Printer 230 is at least provided with blue tooth technology, though the other network connected devices the fax 220, multifunction device 222, scanner 224, and production printer 226 may also be so equipped. Printer 230 may also be provided with an activation control 231 which may be interacted with by end user 250. Activation control 231 may be a simple button or toggle switch, or in the alternative or in addition it may be arranged as part of a GUI or in a pull-down menu.

Figure 3:
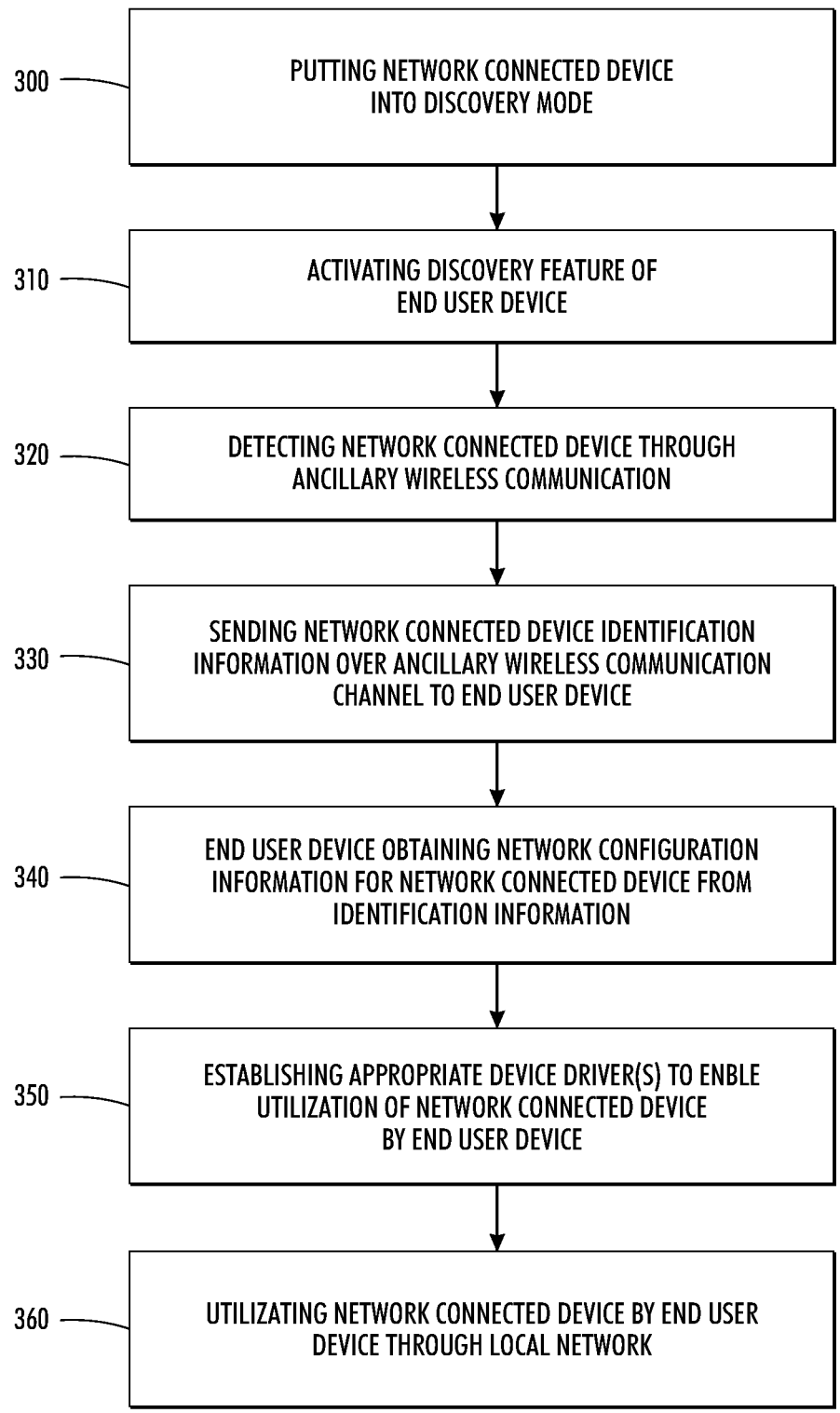
FIG. 3 illustrates a flowchart showing a process that enables a mobile device to acquire network identification information and network configuration information for a networked connected device via an ancillary wireless communication channel.

FIG. 3 shows in flowchart form how such a process would be carried out according to the teachings provided herein.

As provided with step 300, end user 250 with notebook 210, approaches printer 230 placing notebook 210 in close proximity with printer 230. The end user 250 puts the network connected printer 230 into a "discovery" mode by engaging activation control 231 that causes the printer to 230 to be discoverable via Bluetooth™ or other ancillary wireless communication. As per step 310, the end user 250 activates device discovery software on the notebook 210.

The invoked software application running discovery on the notebook 210 will thus detect any Bluetooth™ or other ancillary wireless communication equipped printing and scanning or fax device within nearby proximity, as per step 320. As will be understood by those skilled in the art, such discovery mechanisms are well contemplated as within the Bluetooth™ standard or other ancillary wireless communication standards; see for example U.S. Pat. No. 7,526,482, to Edwards et al., the entire content of U.S. Pat. No. 7,526,482 being is herby incorporated by reference.

The application further instructs the network connected device to send network identification information over the Bluetooth™ or other ancillary wireless communication connection to the user notebook 210, as indicated in step 330. In step 340, the software application running discovery on the notebook 210 will thereby obtain network configuration information from the printer 230 via the Bluetooth™ or other ancillary wireless communication connection. As next step 350 indicates, a software application running discovery on the notebook 210 will configure the notebook with the correct device drivers for the printer 230.

Finally, as indicated by step 360, the end user 250 will now be able to print from the network connected notebook 210 using standard network protocols whenever it is connected to the local area network 100 by virtue of having the correct connection configuration and device driver installed.

In another embodiment as discussed above, the above methodology could be implemented on a portable handheld device such as a wireless phone. If implemented on such a portable device the system network 100 would provide a set of instructions for the controller processor of the portable device.

As will be well understood by one skilled in the art, the Bluetooth™ or other ancillary wireless communication discovery application may be invoked upon start-up and run resident in the background of the operation of notebook 210. The printer 230 may also be equipped with a discovery application, thus obviating the need for a manifest button such as provided by activation control 231. Such alternative arrangements are fully contemplated by the teachings provided herein.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

What is claimed is:

1. A system for enabling an end user mobile device to acquire network identification and network configuration information for a networked connected device via an ancillary wireless communication channel to enable the end user mobile device to utilize the networked connected device, comprising:
    a local area network providing a plurality of network communication channels;
    an electronic device, communicatively connected to said local area network, said electronic device having a network communication device to provide the communicative connection between said electronic device and said local area network over a first network communication channel;
    said electronic device having an ancillary wireless communication transmitter/receiver, said ancillary wireless communication transmitter/receiver of said electronic device using a communication protocol; and
    an end user mobile device having an ancillary wireless communication transmitter/receiver, said ancillary wireless communication transmitter/receiver of said end user mobile device using a communication protocol that matches said communication protocol of the ancillary wireless communication transmitter/receiver of said electronic device, said communication protocol enabling a wireless communication channel to be established between said end user mobile device and said electronic device, said wireless communication channel not being one of the plurality of network communication channels provided by said local area network;
    said ancillary wireless communication transmitter/receiver of said end user mobile device communicating with said ancillary wireless communication transmitter/receiver of said electronic device over said wireless communication channel;
    said end user mobile device having a network communication device to provide communication between said end user mobile device and said local area network over a second network communication channel;
    said electronic device transmitting, through the ancillary wireless communication transmitter/receiver of said electronic device and over said wireless communication channel, identification and network configuration information for said electronic device to said end user mobile device, the ancillary wireless communication transmitted identification and network configuration information including an internet protocol address for said electronic device;
    said end user mobile device receiving, over said wireless communication channel, the identification and network configuration information for said electronic device;
    said end user mobile device, based upon the received identification and network configuration information for said electronic device, locating, through said second network communication channel, a device driver associated with said electronic device;
    said end user mobile device installing, through said second network communication channel, said device driver associated with said electronic device, said device driver enabling said end user mobile device to utilize, via said local area network, said electronic device;
    said end user mobile device, based upon the received internet protocol address for said electronic device, establishing a communication connection, through said second network communication channel, via said local area network, and said first network communication channel, with said electronic device;
    said end user mobile device causing, by utilizing the installed device driver, said electronic device to operate.

2. The system of claim 1, wherein said electronic device is a device having a printing capability and the identification and network configuration information for said electronic device comprises a printer model.

3. The system of claim 1, wherein said end user mobile device comprises a personal digital assistant.

4. The system of claim 1, wherein said end user mobile device comprises a mobile computing device.

5. The system of claim 1, wherein the ancillary wireless communication transmitter/receiver of said end user mobile device includes a mode of operation that enables said end user mobile device to be discoverable by another device having ancillary wireless communication functionality.

6. The system of claim 1, wherein the ancillary wireless communication transmitter/receiver of said electronic device includes a mode of operation that enables said electronic device to be discoverable by another device having ancillary wireless communication functionality.

7. The system of claim 1, wherein said wireless communication channel is a low-power radio communication channel.

8. A method to enable an end user mobile device to acquire network identification and network configuration information for a networked connected device via an ancillary wireless communication channel to enable the end user mobile device to utilize the networked connected device, comprising:
    placing an end user mobile device in close physical proximity to an electronic device communicatively connected to a local area network the local area network providing a plurality of network communication channels, the electronic device having a network communication device to provide the communicative connection between the electronic device and the local area network over a first network communication channel, the electronic device having an ancillary wireless communication transmitter/receiver, the ancillary wireless communication transmitter/receiver of the electronic device using a communication protocol, the end user mobile device having an ancillary wireless communication transmitter/receiver, the ancillary wireless communication transmitter/receiver of the end user mobile device using a communication protocol that matches the communication protocol of the ancillary wireless communication transmitter/receiver of the electronic device, the communication protocol enabling a wireless communication channel to be established between the end user mobile device and the electronic device and a network communication device to provide communication between the end user mobile device and the local area network over a second network communication channel, the wireless communication channel not being one of the plurality of network communication channels provided by the local area network;

establishing a communication connection, over the wireless communication channel, between the end user mobile device and the electronic device when the end user mobile device is located in close proximity to the electronic device;

obtaining, by the end user mobile device over the wireless communication channel, network configuration connection information for the electronic device from the electronic device, the network configuration connection information being transmitted over the wireless communication channel, the network configuration connection information including an internet protocol address for the electronic device;

locating, based upon the received identification and network configuration information, by the end user mobile device, through the second network communication channel, a device driver associated with the electronic device;

installing, by the end user mobile device, through the second network communication channel, the device driver associated with the electronic device, the device driver enabling the end user mobile device to utilize, via the local area network, the electronic device;

establishing, by the end user mobile device, a communication connection, through the second network communication channel, via the local area network, and the first network communication channel, between the end user mobile device and the electronic device based upon the obtained ancillary wireless communication connection transmitted internet protocol for the electronic device; and causing, by the end user mobile device utilizing the installed device driver, the electronic device to operate.

9. The method of claim 8, wherein the ancillary wireless communication transmitter/receiver of the end user mobile device includes a mode of operation that enables the end user mobile device to be discoverable by another device having ancillary wireless communication functionality.

10. The method of claim 8, wherein the ancillary wireless communication transmitter/receiver of the electronic device includes a mode of operation that enables the electronic device to be discoverable by another device having ancillary wireless communication functionality.

11. The method of claim 8, wherein the wireless communication channel is a low-power radio communication channel.

12. The method of claim 8, wherein the electronic device is a printer.

13. The method of claim 8, wherein the network connected device is a scanner.

14. The method of claim 8, wherein the end user mobile device comprises a personal computer.

15. The method of claim 8, wherein said end user mobile device comprises a personal digital assistant.

16. The method of claim 8, wherein the electronic device is a multifunction device including printing and scanning functionality.

\* \* \* \* \*